(12) United States Patent
Wasko et al.

(10) Patent No.: US 11,907,754 B2
(45) Date of Patent: Feb. 20, 2024

(54) SYSTEM TO TRIGGER TIME-DEPENDENT ACTION

(71) Applicant: Mellanox Technologies, Ltd., Yokneam (IL)

(72) Inventors: Wojciech Wasko, Młynek (PL); Dotan David Levi, Kiryat Motzkin (IL); Liron Mula, Ramat Gan (IL); Natan Manevich, Ramat HaSharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/549,949

(22) Filed: Dec. 14, 2021

(65) Prior Publication Data

US 2023/0185600 A1    Jun. 15, 2023

(51) Int. Cl.
*G06F 9/48* (2006.01)
*G06F 1/08* (2006.01)
*G06F 13/16* (2006.01)

(52) U.S. Cl.
CPC .............. *G06F 9/4825* (2013.01); *G06F 1/08* (2013.01); *G06F 9/485* (2013.01); *G06F 13/1689* (2013.01)

(58) Field of Classification Search
CPC ...... G06F 9/4825; G06F 9/4837; G06F 9/485; G06F 9/5005; G06F 13/1689; G06F 1/08
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |

(Continued)

FOREIGN PATENT DOCUMENTS

| | | |
|---|---|---|
| CN | 106817183 A | 6/2017 |
| CN | 108829493 A | 11/2018 |

(Continued)

OTHER PUBLICATIONS

IEEE Standard 1588™—2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

(Continued)

*Primary Examiner* — Raymond N Phan
(74) *Attorney, Agent, or Firm* — Kligler & Associates Patent Attorneys Ltd.

(57) ABSTRACT

In one embodiment, a system includes a memory, a processing device including a device processor; and a device clock, and a peripheral device including an interface to share data with the processing device, a hardware clock, and processing circuitry to write respective interrupt signaling messages to the memory responsively to respective hardware clock values of the hardware clock, and wherein the device processor is configured, responsively to the respective interrupt signaling messages being written to the memory, to perform a time-dependent action.

28 Claims, 4 Drawing Sheets

(56) References Cited

U.S. PATENT DOCUMENTS

| | | |
|---|---|---|
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 | 4/2003 | Takagi |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,164,759 B1 | 12/2018 | Volpe |
| 10,320,646 B2 | 6/2019 | Mirsky et al. |
| 10,637,776 B2 | 4/2020 | Iwasaki |
| 10,727,966 B1 | 7/2020 | Izenberg et al. |
| 11,070,304 B1 | 7/2021 | Levi et al. |
| 11,379,334 B1 | 7/2022 | Srinivasan et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0257458 A1 | 10/2009 | Cui et al. |
| 2010/0280858 A1 | 11/2010 | Bugenhagen |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1* | 7/2014 | Zeng .................... G06F 3/0202 |
| | | 361/679.08 |
| 2014/0185632 A1 | 7/2014 | Steiner et al. |
| 2014/0253387 A1 | 9/2014 | Gunn et al. |
| 2014/0281036 A1* | 9/2014 | Cutler ................ H04L 67/1095 |
| | | 709/248 |
| 2014/0301221 A1 | 10/2014 | Nadeau et al. |
| 2014/0321285 A1 | 10/2014 | Chew et al. |
| 2015/0019839 A1* | 1/2015 | Cardinell .................. G06F 1/14 |
| | | 712/31 |
| 2015/0078405 A1 | 3/2015 | Roberts |
| 2015/0092793 A1 | 4/2015 | Aweya |
| 2015/0127978 A1 | 5/2015 | Cui et al. |
| 2015/0163050 A1 | 6/2015 | Han et al. |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0110211 A1 | 4/2016 | Karnes |
| 2016/0140066 A1* | 5/2016 | Worrell ............... G06F 13/4291 |
| | | 710/110 |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1* | 6/2017 | De Jong ............... G06F 3/0619 |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0220300 A1 | 7/2019 | Rosenboom |
| 2019/0265997 A1 | 8/2019 | Merrill et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0141413 A1* | 5/2021 | Levi ........................ G06F 1/14 |
| 2021/0218431 A1 | 7/2021 | Narayanan et al. |
| 2021/0243140 A1 | 8/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 | 12/2021 | Ranganathan et al. |
| 2022/0021393 A1 | 1/2022 | Ravid et al. |
| 2022/0066978 A1 | 3/2022 | Mishra et al. |
| 2022/0116473 A1* | 4/2022 | Levi .................... H04L 67/5681 |

(56) References Cited

U.S. PATENT DOCUMENTS

| | | | |
|---|---|---|---|
| 2022/0173741 A1* | 6/2022 | Ravid | G06F 1/12 |
| 2022/0239549 A1* | 7/2022 | Zhao | H04L 41/069 |
| 2022/0342086 A1 | 10/2022 | Yoshida | |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3(SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Wikipedia—"Precision Time Protocol", pp. 1-8, Aug. 24, 2019.

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

Weibel, H., "High Precision Clock Synchronization according to IEEE 1588 Implementation and Performance Issues", Zurich University of Applied Sciences, pp. 1-9, Jan. 17, 2005.

Lu et al., "A Fast CRC Update Implementation", Computer Engineering Laboratory, Electrical Engineering Department, pp. 113-120, Oct. 8, 2003.

Texas Instruments, "LMK05318 Ultra-Low Jitter Network Synchronizer Clock With Two Frequency Domains," Product Folder, pp. 1-86, Dec. 2018.

Dlugy-Hegwer et al., "Designing and Testing IEEE 1588 Timing Networks", Symmetricom, pp. 1-10, Jan. 2007.

Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.

ITU-T recommendation, "G.8273.2/Y.1368.2—Timing characteristics of telecom boundary clocks and telecom time slave clocks", pp. 1-50, Jan. 2017.

Levy et al., U.S. Appl. No. 17/313,026, filed May 6, 2021.

Levi et al., U.S. Appl. No. 17/120,313, filed Dec. 14, 2020.

Mula et al., U.S. Appl. No. 17/148,605, filed Jan. 14, 2021.

EP Application # 22151451.6 Search Report dated Jun. 17, 2022.

U.S. Appl. No. 16/779,611 Office Action dated Jun. 24, 2022.

"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.

U.S. Appl. No. 17/120,313 Office Action dated Aug. 29, 2022.

ITU-T Standard G.8262/Y.1362, "Timing characteristics of synchronous equipment slave clock", pp. 1-44, Nov. 2018.

ITU-T Standard G.8264/Y.1364, "Distribution of timing information through packet networks", pp. 1-42, Aug. 2017.

ITU-T Standard G.8261/Y.1361, "Timing and synchronization aspects in packet networks", pp. 1-120, Aug. 2019.

Ipclock, "IEEE 1588 Primer," ip-clock.com, pp. 1-3, May 1, 2017 (downloaded from https://web.archive.org/web/20170501192647/http://ip-clock.com/IEEE-1588-primer/).

U.S. Appl. No. 16/900,931 Office Action dated Apr. 28, 2022.

U.S. Appl. No. 16/683,309 Office Action dated Mar. 17, 2022.

U.S. Appl. No. 16/779,611 Office Action dated Mar. 17, 2022.

U.S. Appl. No. 17/120,313 Office Action dated Mar. 28, 2022.

U.S. Appl. No. 17/191,736 Office Action dated Apr. 26, 2022.

EP Application # 21214269 Search Report dated May 2, 2022.

U.S. Appl. No. 17/148,605 Office Action dated May 17, 2022.

U.S. Appl. No. 17/579,630 Office Action dated Oct. 24, 2022.

U.S. Appl. No. 17/579,630 Office Action dated Jan. 12, 2023.

U.S. Appl. No. 17/670,540 Office Action dated Jan. 18, 2023.

U.S. Appl. No. 17/191,736 Office Action dated Nov. 10, 2022.

U.S. Appl. No. 17/191,736 Advisory Action dated Feb. 16, 2023.

"IEEE Standard for Local and Metropolitan Area Networks—Timing and Synchronization for Time-Sensitive Applications," IEEE Std 802.1AS-2020, IEEE Computer Society, pp. 1-421, year 2020.

U.S. Appl. No. 17/871,937 Office Action dated Aug. 1, 2023.

U.S. Appl. No. 17/578,115 Office Action dated Apr. 26, 2023.

U.S. Appl. No. 17/534,776 Office Action dated Jun. 29, 2023.

SiTime Corporation, "Sit5377—60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.

PCI-SIG, "PCI Express®—Base Specification—Revision 3.0," pp. 1-860, Nov. 10, 2010.

U.S. Appl. No. 17/191,736 Office Action dated Jun. 26, 2023.

U.S. Appl. No. 17/313,026 Office Action dated Dec. 19, 2023.

U.S. Appl. No. 17/191,736 Office Action dated Jan. 5, 2024.

* cited by examiner

SYSTEM TO TRIGGER TIME-DEPENDENT ACTION

FIELD OF THE INVENTION

The present invention relates to computer systems, and in particular, but not exclusively, to time synchronization.

BACKGROUND

In computer networks, each node (such as a switch or endpoint) typically has its own real-time clock. In many applications, it is desirable that the real-time clocks of different nodes be precisely synchronized. Such synchronization can be difficult to achieve, however, due to the latency and jitter involved in distributing clock synchronization messages among the nodes.

The Precision Time Protocol (PTP) was conceived as a solution to this problem. This protocol enables network nodes, using messaging between the nodes and a master device, to determine the offset of their respective clocks to levels of accuracy in the nanosecond range. For maximum accuracy in measuring the clock offsets, hardware-based time stamping is generally used, as described, for example, by Weibel and Bechaz in "Implementation and Performance of Time Stamping Techniques," 2004 Conference on IEEE 1588 (Sep. 28, 2004), which is incorporated herein by reference. A PTP hardware clock (PHC) is a hardware clock (e.g., including an oscillator and a counter), which runs according to PTP format. The PHC is synchronized to a master in the network.

Successfully running the PTP protocol generally needs accurate timestamping for received packets so that the timestamping point is not affected by the load of the network or the CPU load of the receiving node. From this reason, hardware timestamping in a network interface controller (NIC) or other network node, is generally better than software timestamping, which may suffer from CPU load inaccuracy, whereas hardware timestamping is more accurate and stable.

In certain applications, for example in a 5G environment or in a datacenter, CPUs may need accurate timestamping. For example, in a 5G environment, CPUs may need to manage and schedule computation and processing that occurs close to real-time, and the CPU clocks need to be synchronized with the over-the-air real-time of the 5G network. PTP cannot be used to synchronize a CPU clock due to lack of hardware support in the CPU for timestamping the synchronization messages. Other synchronization protocols, such as peripheral component interconnect express (PCIe) Precision Time Measurement (PTM) may be used to synchronize the CPU clock with a NIC hardware clock. However, these protocols are not supported in many systems.

SUMMARY

There provided in accordance with an embodiment of the present disclosure, a system including a memory, a processing device including a device processor, and a peripheral device, including an interface to share data with the processing device, a hardware clock, and processing circuitry to write respective interrupt signaling messages to the memory responsively to respective hardware clock values of the hardware clock, and wherein the device processor is configured, responsively to the respective interrupt signaling messages being written to the memory, to perform a time-dependent action.

Further in accordance with an embodiment of the present disclosure, the system includes at least one other processing device connected to the peripheral device, wherein the at least one other processing device is configured responsively to other interrupt signaling messages being written to the memory, to perform other time-dependent actions.

Still further in accordance with an embodiment of the present disclosure the device processor is configured, responsively to the respective interrupt signaling messages being written to the memory, to run a given software program.

Additionally in accordance with an embodiment of the present disclosure the device processor is configured, responsively to the respective interrupt signaling messages being written to the memory, to pause a given software program.

Moreover, in accordance with an embodiment of the present disclosure the device processor is configured, responsively to the respective interrupt signaling messages being written to the memory, to send a given message.

Further in accordance with an embodiment of the present disclosure the device processor is configured, responsively to the respective interrupt signaling messages being written to the memory, to save a software program context.

Still further in accordance with an embodiment of the present disclosure the device processor includes at least one of a central processing unit, a graphics processing unit, a data processing unit, or a network interface controller.

Additionally in accordance with an embodiment of the present disclosure the device processor is configured to request the processing circuitry to commence a process of writing the respective interrupt signaling messages to the memory, and the processing circuitry is configured to write each of the respective interrupt signaling messages to the memory without needing corresponding individual respective requests from the device processor for writing each of the respective interrupt signaling messages to the memory.

Moreover, in accordance with an embodiment of the present disclosure the processing circuitry is configured to discipline the hardware clock from a remote reference clock.

Further in accordance with an embodiment of the present disclosure the processing device includes a device clock, the processing circuitry is configured to write the respective interrupt signaling messages to the memory over the interface responsively to respective hardware clock values of the hardware clock and a common schedule known to the processing device and the peripheral device, the device processor is configured, responsively to the respective interrupt signaling messages being written to the memory, to retrieve respective device clock values from the device clock, and find the respective hardware clock values at which the respective interrupt signaling messages were written to the memory responsively to the schedule, and the device processor is configured to compute respective time differences between the retrieved respective device clock values and the found respective hardware clock values, and discipline the device clock responsively to ones of the respective time differences.

Still further in accordance with an embodiment of the present disclosure the processing device includes an interface controller to detect the writing of the respective interrupt signaling messages in the memory, interrupt processing of the device processor responsively to the detection of each of the respective interrupt signaling messages being written to the memory, and cause the device processor to retrieve the respective device clock values from the device clock, find the respective hardware clock values at which the respective interrupt signaling messages were written to the memory responsively to the schedule, and discipline the device clock responsively to the respective ones of the respective time differences.

Additionally in accordance with an embodiment of the present disclosure the device processor is configured to compute an average time value responsively to the respective time differences in a time window, and discipline the device clock responsively to the average time value.

Moreover, in accordance with an embodiment of the present disclosure the device processor is configured to find a smallest time difference of the respective time differences in a time window, and discipline the device clock responsively to the smallest time difference.

Further in accordance with an embodiment of the present disclosure the processing circuitry is configured to write the respective interrupt signaling messages in the memory using atomic writes.

There is also provided in accordance with another embodiment of the present disclosure, a system including a memory, a processing device including a device processor, and a device clock, and a peripheral device, including an interface to share data with the processing device, a hardware clock, and processing circuitry to discipline the hardware clock from a remote reference clock, retrieve respective hardware clock values from the hardware clock, and write respective clock synchronization messages including the retrieved respective hardware clock values to the memory, and wherein the device processor is configured to retrieve respective device clock values from the device clock responsively to the respective clock synchronization messages being written to the memory, compute respective time differences between the respective hardware clock values included in the respective clock synchronization messages and the respective retrieved device clock values, and discipline the device clock responsively to ones of the respective time differences.

Still further in accordance with an embodiment of the present disclosure the device processor includes at least one of a central processing unit, a graphics processing unit, a data processing unit, or a network interface controller.

Additionally in accordance with an embodiment of the present disclosure the device processor is configured to request the processing circuitry of the peripheral device to commence a process of writing the respective clock synchronization messages to the memory, and the processing circuitry of the peripheral device is configured to write each of the respective clock synchronization messages to the memory without needing corresponding individual respective requests from the device processor for writing each of the respective clock synchronization messages to the memory.

Moreover in accordance with an embodiment of the present disclosure the respective clock synchronization messages are respective interrupt signaling messages, and the processing device includes an interface controller to detect the writing of the respective clock synchronization messages in the memory and interrupt processing of the device processor responsively to the detection of each of the respective clock synchronization messages being written to the memory, and cause the device processor to retrieve the respective device clock values from the device clock responsively to the respective clock synchronization messages being written to the memory, compute the respective time differences between the respective hardware clock values included in the respective clock synchronization messages and the respective retrieved device clock values, and discipline the device clock responsively to the ones of the respective time differences.

Further in accordance with an embodiment of the present disclosure the device processor is configured to monitor the memory for updates, detect the writing of the respective clock synchronization messages in the memory, and retrieve the respective device clock values from the device clock responsively to detecting the writing of the respective clock synchronization messages in the memory.

Still further in accordance with an embodiment of the present disclosure the processing circuitry is configured to write the respective clock synchronization messages in the memory using atomic writes.

There is also provided in accordance with still another embodiment of the present disclosure a method including writing respective interrupt signaling messages to a memory responsively to respective hardware clock values of a hardware clock, and performing a time-dependent action responsively to the respective interrupt signaling messages being written to the memory.

Additionally in accordance with an embodiment of the present disclosure, the method includes running a given software program responsively to the respective interrupt signaling messages being written to the memory.

Moreover, in accordance with an embodiment of the present disclosure, the method includes pausing a given software program responsively to the respective interrupt signaling messages being written to the memory.

Further in accordance with an embodiment of the present disclosure, the method includes sending a given message responsively to the respective interrupt signaling messages being written to the memory.

Still further in accordance with an embodiment of the present disclosure, the method includes saving a software program context responsively to the respective interrupt signaling messages being written to the memory.

Additionally in accordance with an embodiment of the present disclosure, the method includes requesting processing circuitry to commence a process of writing the respective interrupt signaling messages to the memory, wherein the writing includes writing each of the respective interrupt signaling messages to the memory without needing corresponding individual respective requests for writing each of the respective interrupt signaling messages to the memory.

Moreover in accordance with an embodiment of the present disclosure the writing includes writing the respective interrupt signaling messages to the memory responsively to respective hardware clock values of the hardware clock and a schedule, the method further including responsively to the respective interrupt signaling messages being written to the memory, retrieving respective device clock values from a device clock and finding the respective hardware clock values at which the respective interrupt signaling messages were written to the memory responsively to the schedule, computing respective time differences between the retrieved respective device clock values and the found respective hardware clock values, and disciplining the device clock responsively to ones of the respective time differences.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
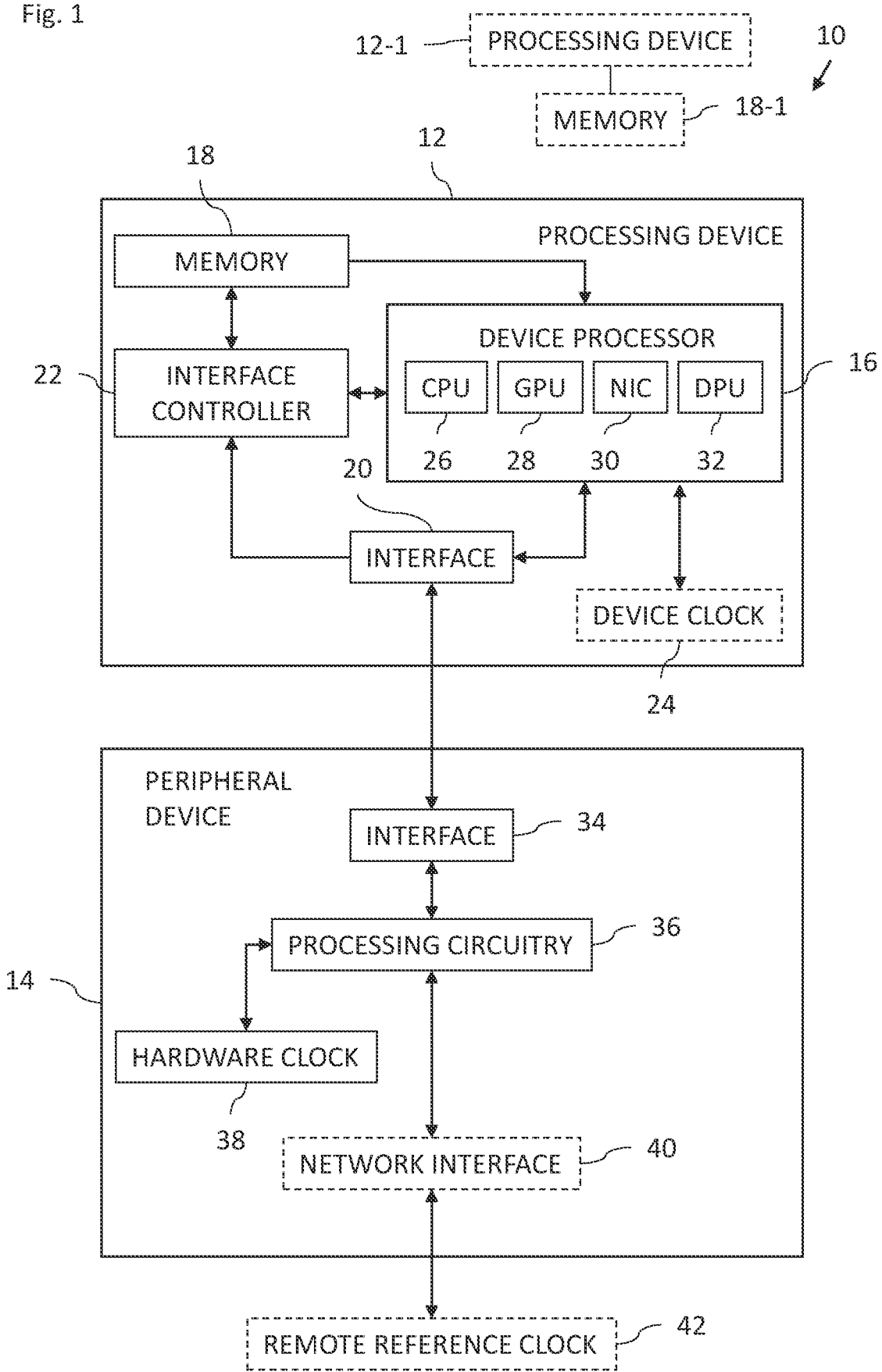
FIG. 1 is a block diagram view of time-dependent action system constructed and operative in accordance with an embodiment of the present invention.

As previously mentioned, in certain applications, for example in a 5G environment or in a datacenter, CPUs may need accurate timestamping. PTP cannot be used to synchronize a CPU clock due to lack of hardware support in the CPU for timestamping the synchronization messages. Other synchronization protocols, such as peripheral component interconnect express (PCIe) Precision Time Measurement (PTM) may be used to synchronize the CPU clock with a NIC hardware clock. However, these protocols are not supported in many systems.

One solution is for the CPU in a host to check its local time, and then retrieve a time from a NIC connected to the host. The CPU then checks its local time again. This is repeated several times. When the difference between the local time is a minimum that minimum is used to adjust the CPU clock. This method is not very accurate and may have errors in the order of microseconds.

Embodiments of the present invention solve the above problems by shifting responsibility for updating the CPU clock from the CPU critical path to the NIC, and synchronizing the CPU clock to the NIC clock, which is a master clock or is synchronized to a master clock, based on detecting messages written by the NIC to a memory, as described in more detail below.

In disclosed embodiments, the NIC writes interrupt signaling messages to a memory based on hardware clock values of the NIC clock. The timing of the writing of the messages may be according to a common schedule (e.g., periodic or according to a pattern) known to both the NIC and the CPU, or may be "on-the-fly". Writing of the messages to the memory is detected, and processing of the CPU is interrupted. The CPU performs a time-dependent action such as synchronization its own clock (i.e., the CPU clock) responsively to the interrupt signaling messages being written to the memory. Examples of how clock synchronization is performed by the CPU are given below.

In some embodiments, the time-dependent action may be unrelated to clock synchronization or may include one or more other time-dependent actions in addition to clock synchronization, such as running a given software program, pausing a given software program, sending a given message, and/or saving a software program context, by way of example. The interrupt signaling messages may include a syntax informing the CPU what time-dependent action should be performed.

Embodiments are described herein with reference to a CPU and CPU clock and a NIC and NIC clock. Any suitable processor and clock may replace the CPU and the CPU clock, such as a graphics processing unit (GPU), data processing unit (DPU) such as a smart NIC, or NIC. Any suitable peripheral device may replace the NIC and NIC clock, such as a smart NIC or accelerator device.

In some embodiments, the CPU may request the NIC to commence a process of writing interrupt signaling messages to a memory (e.g., in the host or any suitable location) according to a schedule known to the CPU and the NIC. For example, the schedule may state that the NIC should write interrupt signaling messages to the memory every round second from a given time. The NIC then writes the interrupt signaling messages to the memory according to the schedule based on the clock time of the NIC's hardware clock. The host (e.g., an interface controller of the host) may detect the writing of one of the interrupt signaling messages to the memory and in response, interrupt processing of the CPU and cause the CPU to retrieve the CPU clock time. The difference between the CPU clock time and the NIC clock time at which the message was written by the NIC to the memory represents the error in the CPU clock time (compared to the NIC hardware clock) and therefore the adjustment that needs to be made to the CPU clock time in order to synchronize the CPU clock to the NIC clock. The time at which the message was written by the NIC to the memory may be derived from the schedule assuming that the CPU clock time is close enough to the NIC clock time. For example, if the NIC writes a message every second on the second, and the CPU clock time is 3.1 seconds, it may be assumed that the NIC clock time is 3 seconds. The CPU clock is then disciplined according to the difference between the CPU clock time and the NIC clock time. The term "discipline" as used in the specification and claims, in all grammatical forms, is defined as correcting a clock value based on an input e.g., from a master clock or another node.

In some embodiments, the interrupt signaling messages or other clock synchronization messages may include the respective NIC clock times at which the respective messages are written to the memory. In such embodiments, the messages do not need to be written according to a schedule known by both the CPU and NIC as the messages include the respective NIC clock times. The messages may be written "on-the-fly" by the NIC to the memory, or a schedule determined by the NIC.

In some embodiments, a correction to the CPU clock may be based on an average of time differences between retrieved CPU clock times and corresponding NIC clock times for a certain time window of the CPU clock times. The NIC may write a series of messages (e.g., 5 or 10 messages), for example, spaced by 10 or 100 milliseconds. The time differences resulting from these series of messages may then be averaged and used to correct the CPU clock. For example, if there are time differences TD1, TD2, and TD3, the correction is based on an average of TD1, TD2 and TD3, where TD1 is equal to the time difference of a first CPU clock time and a corresponding NIC clock time, and so on.

In some embodiments, a correction to the CPU clock may be based on a smallest time difference between retrieved CPU clock times and corresponding NIC clock times for a certain time window of the CPU clock times. The NIC may write a series of messages (e.g., 5 or 10 messages), for example, spaced by 10 or 100 milliseconds. The smallest time difference resulting from these series of messages may then be averaged and used to correct the CPU clock. For example, if there are time differences TD1, TD2, and TD3, the correction is based on a smallest value selected from TD1, TD2, and TD3, where TD1 is equal to the time difference of a first CPU clock time and a corresponding NIC clock time, and so on.

The above embodiments may be implemented in any suitable environment. In one environment, a host including the CPU is connected to a NIC, which is connected to an antenna, which performs wireless communication via the 5G communication standard. The NIC clock may receive its time via PTP clock synchronization from the antenna's clock, or from a satellite via a ground station server (GSS) receiver or from some other master clock in a network with the NIC. The NIC and antenna clock or other clock are synchronized via PTP or some other method. The CPU clock may be synchronized to the NIC clock using one of the methods described herein so that the CPU can apply accurate timestamping suitable for the 5G communication standard.

In another embodiment, multiple hosts may be connected to a NIC, which writes respective messages to memory of the multiple hosts so that on detection of the writing of the respective messages to memory the respective hosts perform respective the time-dependent actions, e.g., time synchronization to the NTC hardware clock. The memory may be shared by the multiple hosts, or each host may include its own memory for writing the respective messages thereto.

In another environment, a datacenter includes a distributed database shared by different nodes. To ensure that the database is viewed consistently from the multiple nodes, each record written to the database has a lifetime as to when it becomes valid. The CPUs of the different nodes need to keep track of time accurately enough to ensure database entry integrity and entries are only written to the database after a delay (given by the maximum time it takes to transfer data from one of the CPUs to the database). The CPUs therefore need accurate clocks to timestamp the write requests to the database. Therefore, the CPUs may use one of the methods described herein to synchronize their clocks to their respective NIC hardware clocks.

System Description

Reference is now made to FIG. 1, which is a block diagram view of time-dependent action system 10 constructed and operative in accordance with an embodiment of the present invention. The system 10 includes a processing device 12 and a peripheral device 14 operationally connected to the processing device 12. The processing device 12 includes a device processor 16, a memory 18, an interface 20, and an interface controller 22, and optionally a device clock 24. The memory 18 may be used by the processor 16 to store data and/or receive messages written by the peripheral device 14. The memory 18 may include a base address register (BAR) or a memory-mapped input/output (MMIO). In some embodiments the memory 18 may be disposed externally to the processing device 12, for example, in the peripheral device 14 or in another peripheral device or external storage device.

The interface 20 is configured to share data with the processing device 12 according to any suitable standard, for example, PCIe. The interface controller 22 is configured to control operation of the interface 20 and monitor writing of messages by the peripheral device 14 to the memory 18 over the interface 20, as described in more detail with reference to FIGS. 2, 3 and 6. The device clock 24 is configured to provide a clock value for use by the device processor 16, for example, to generate timestamps.

The device processor 16 may include one or more of the following: a central processing unit (CPU) 26; a graphics processing unit (GPU) 28; a data processing unit DPU 30 (e.g., a smart NIC including packet processing circuitry such as a physical layer (PHY) and medium access control (MAC) chip as well as core processors, e.g., ARM processors); or a network interface controller 32 (e.g., including packet processing circuitry such as a PHY and MAC chip). The functions performed by the device processor 16 are described in more detail with reference to FIGS. 2-6. In practice, some or all of the functions of the device processor 16 may be combined in a single physical component or, alternatively, implemented using multiple physical components. These physical components may comprise hard-wired or programmable devices, or a combination of the two. In some embodiments, at least some of the functions of the device processor 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The peripheral device 14 includes an interface 34, processing circuitry 36, a hardware clock 38, and optionally a network interface 40. The peripheral device 14 may be implemented as any suitable peripheral device, for example, data communication device such as a NIC, DPU (e.g., smart NIC), or switch, or another processing device, e.g., a hardware accelerator.

The interface 34 (e.g., a peripheral bus interface) is configured to share data with the processing device 12 according to any suitable standard, for example, PCIe. The hardware clock 38 may be any suitable hardware clock, for example, a PTP hardware clock (PHC). The hardware clock 38 may be synchronized with a remote reference clock 42 via a network connection, a wireless connection, or a satellite connection (via a ground station server (GSS) receiver). The network interface 40 may include ports (not shown) and may be configured to share data with devices over a network, e.g., an Ethernet network.

The processing circuitry 36 may include a processor or other suitable processing circuitry, such as packet processing circuitry including a PHY and MAC chip, and/or a hardware accelerator. The functions of the processing circuitry 36 are described in more detail with reference to FIGS. 2, 3 and 6. In practice, some or all of the functions of the processing circuitry 36 may be combined in a single physical component or, alternatively, implemented using multiple physical components. These physical components may comprise hard-wired or programmable devices, or a combination of the two. In some embodiments, at least some of the functions of the processing circuitry 36 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
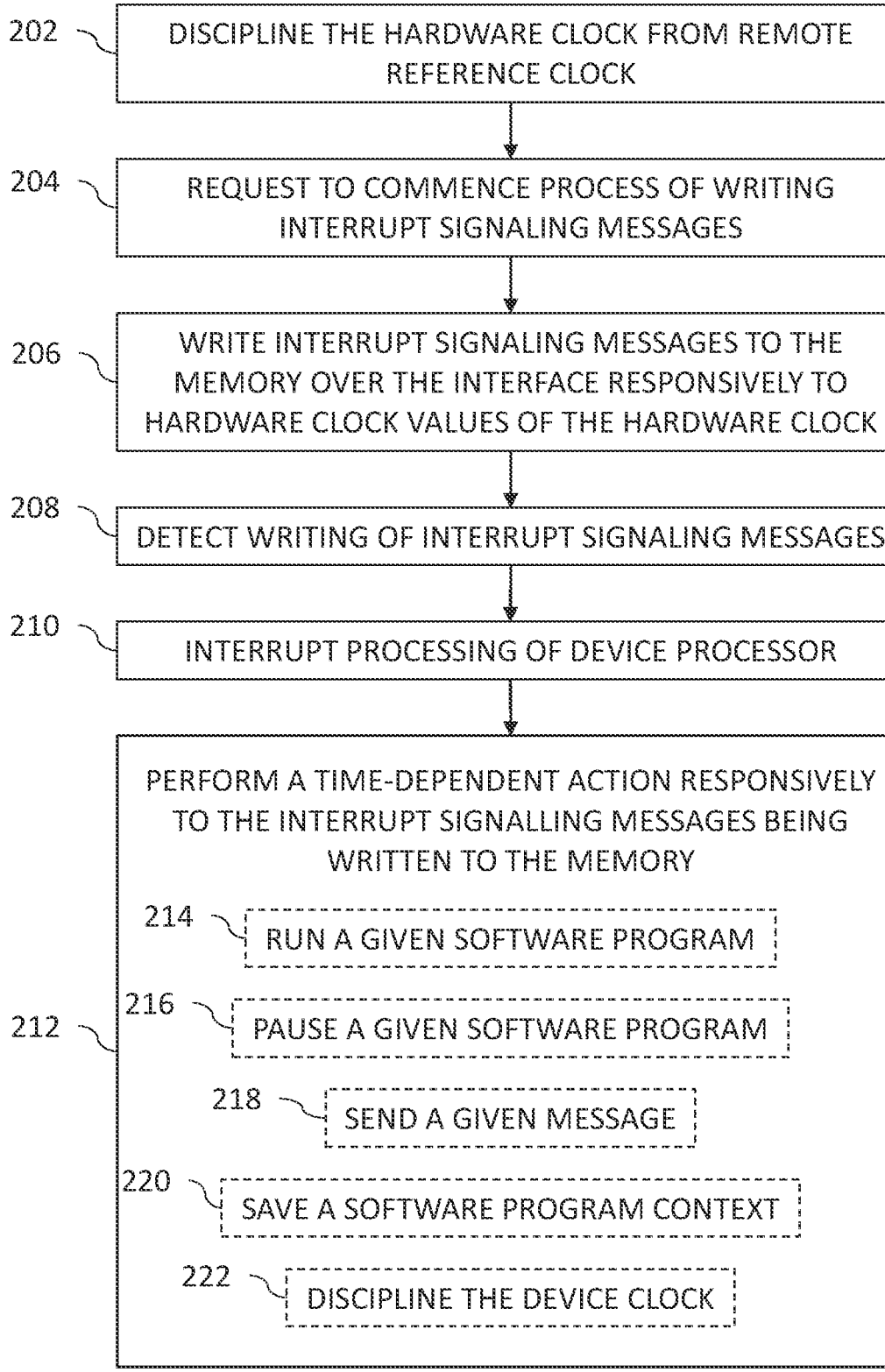
FIG. 2 is a flowchart including steps in a method of operation of the system of FIG. 1.

Reference is now made to FIG. 2, which is a flowchart 200 including steps in a method of operation of the system 10 of FIG. 1. The processing circuitry 36 is configured to discipline the hardware clock 38 from the remote reference clock 42 (block 202) using any suitable time synchronization method or protocol, for example, PTP. The device processor 16 is configured to request the processing circuitry 36 to commence a process of writing respective interrupt signaling messages to the memory 18 (block 204). The request may include the time at which the writing should start, a reference to a schedule for writing the messages, and optionally if the messages should include any data (e.g., identifying what process the device processor 16 should perform upon writing of the messages to the memory 18).

In response to receiving the request to commence the process, the processing circuitry 36 is configured to write each of the respective interrupt signaling messages to the memory 18 over the interface 34 responsively to respective hardware clock values of the hardware clock 38 (block 206). For example, the messages may include respective hardware clock values (e.g., message A written at time X includes time X, and so on), and/or may be written according to a schedule (e.g., message A is written at time X, message B is written at time Y, and so on, where times X and Y are according to a schedule known to the peripheral device 14 and the processing device 12.

In some embodiments, the processing circuitry 36 is configured to write each of the respective interrupt signaling messages to the memory 18 without needing corresponding individual respective requests from the device processor 16 for writing each of the respective interrupt signaling messages to the memory 18. In some embodiments, the processing circuitry 36 is configured to write each of the respective interrupt signaling messages in the memory 18 using atomic writes. In some embodiments, the messages may be respective memory write requests to a memory location (optionally not fixed) on the processing device 12 or another device.

In some embodiments, the processing circuitry 36 is configured to write the respective interrupt signaling messages to the memory 18 over the interface 34 responsively to respective hardware clock values of the hardware clock 38 and a common schedule known to the processing device 12 and the peripheral device 14. For example, message A is written at time X, message B is written at time Y, and so on, where times X and Y are according to a schedule known to the peripheral device 14 and the processing device 12. The schedule may specify that messages are written periodically from a given start time, or intermittently, or according to any suitable pattern. When the messages are written according to the schedule, the messages may exclude or include the respective hardware clock values. The schedule may be sent to the processing circuitry 36 by the processing device 12 as part of the request of the step of block 204.

In some embodiments, the interrupt signaling messages may be high priority synchronization messages and do not generally include any auxiliary data according to x86 architecture and PCIe specification. Therefore, according to the x86 architecture and PCIe specification, the messages do not include the hardware clock times at which the respective messages are written to the memory 18. Therefore, in some embodiments where the processing device 12 uses the hardware clock times (e.g., for clock synchronization purposes), the processing device 12 derives the hardware clock times at which the messages are written to the memory 18 based on the common schedule. For example, if the NIC writes a message every second on the second, and the CPU clock time is 3.1 seconds when the message was written to the memory 18, it may be assumed that the NIC clock time is 3 seconds.

The interface controller 22 (e.g., PCIe controller or root port) is configured to detect the writing of each of the respective interrupt signaling messages in the memory 18 (block 208). The interface controller 22 is configured to interrupt processing of the device processor 16 responsively to the detection of each of the respective interrupt signaling messages being written to the memory 18 (block 210).

The device processor 16 is configured, responsively to each of the respective interrupt signaling messages being written to the memory 18, to perform a time-dependent action (block 212). In some embodiments, the interface controller 22 is configured, responsively to each of the respective interrupt signaling messages being written to the memory 18, to cause the device processor 16 to perform a time-dependent action.

In some embodiments, at least one other processing device 12-1 is connected to the peripheral device 14. For example, a single NIC may serve the processing device 12 (e.g., a first host) and the other processing device(s) 12-1 (e.g., another host). The other processing device(s) 12-1 may be configured responsively to other interrupt signaling messages being written to the memory 18 or another memory 18-1 (or memories) by the peripheral device 14, to perform other time-dependent actions, e.g., time-synchronization actions such as synchronizing the time of the other processing device(s) 12-1 to the time of the hardware clock 38.

In some embodiments, the time-dependent action may be unrelated to clock synchronization or may include one or more other time-dependent actions in addition to clock synchronization, such as running a given software program, pausing a given software program, sending a given message, and/or saving a software program context, by way of example. The interrupt signaling messages may include a syntax informing the CPU what time-dependent action should be performed.

Therefore, the device processor 16 may be configured, responsively to each of the respective interrupt signaling messages being written to the memory 18, to perform one or more of the following: run a given software program (block 214), pause a given software program (block 216), send a given message (block 218), and/or save a software program context (block 220), and/or discipline the device clock 24 (block 222), by way of example.

Figure 3:
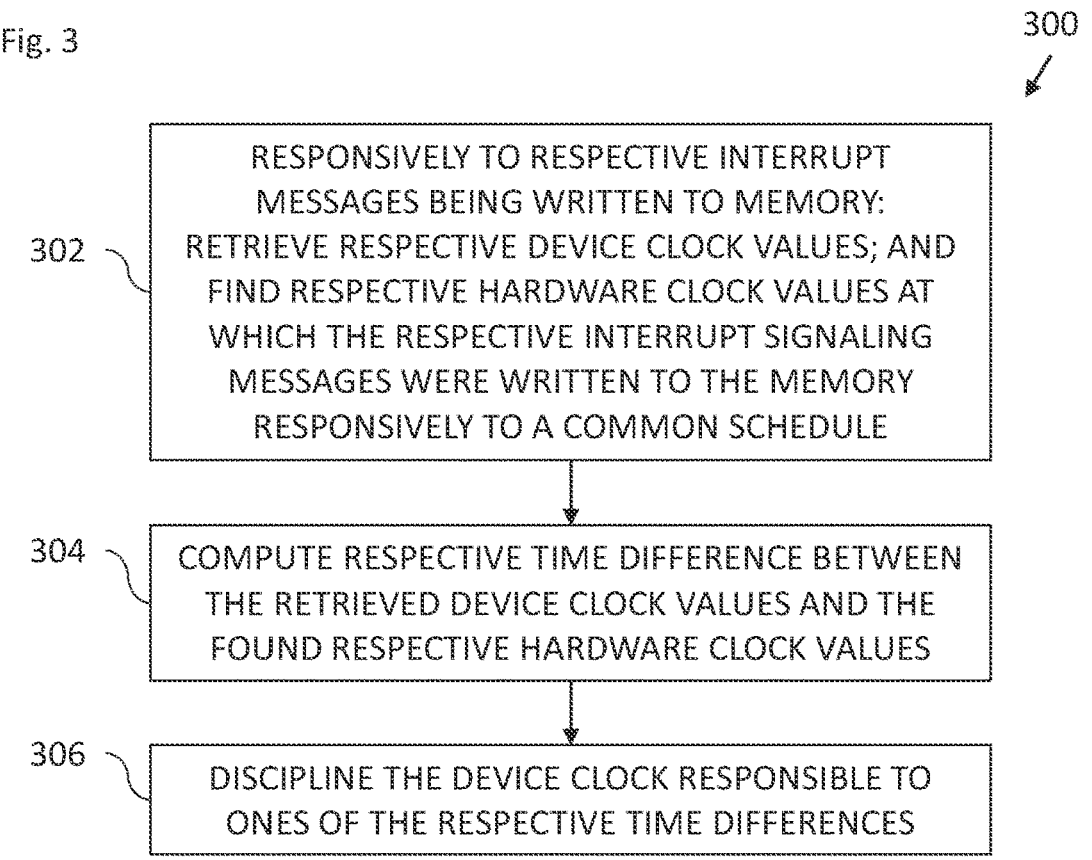
FIG. 3 is a flowchart including steps in a time-synchronization sub-method of the method of FIG. 2.

Reference is now made to FIG. 3, which is a flowchart 300 including steps in a time-synchronization sub-method of the method of FIG. 2. The step of block 212 of FIG. 2 may include sub-steps 302-306 to perform a time-synchronization sub-method.

The device processor 16 is configured, responsively to the respective interrupt signaling messages (e.g., message M1 written at time Y1, message M2 written at time Y2, message M3 written at time Y3) being written to the memory 18, to: retrieve respective device clock values (e.g., times X1, X2, X3) from the device clock 24; and find the respective hardware clock values (e.g., times Y1, Y2, Y3) at which the respective interrupt signaling messages were written to the memory 18 responsively to the schedule (block 302). The device processor 16 is configured to compute respective time differences (e.g., Y1-X1, Y2-X2, Y3-X3) between the retrieved respective device clock values (e.g., times X1, X2, X3) and the found respective hardware clock values (e.g., times Y1, Y2, Y3) (block 304). The device processor 16 is configured to discipline the device clock 24 responsively to ones of the respective time differences (block 306) (e.g., one or more of Y1-X1, Y2-X2, and/or Y3-X3).

For example, if the next interrupt signaling message is meant to be written to the memory 18 at time Y1 according to the schedule, the processing circuitry 36 queries the hardware clock 38 periodically and when the time is equal to Y1, the processing circuitry 36 writes an interrupt signaling message M1 to the memory. The writing of interrupt signaling message M1 to the memory 18 is detected by the interface controller 22, which interrupts processing of the device processor 16 and causes the device processor 16 to retrieve a device clock value (say, device clock value X1) from the device clock 24. The device processor 16 finds (e.g., derives) the hardware clock value (time Y1) at which interrupt signaling message M1 was written to the memory 18 responsively to the schedule. The device processor 16 computes the time difference between the retrieved device clock value (device clock value X1) and the found hardware clock value (time Y1). The device processor 16 is configured to discipline the device clock 24 responsively to computed time difference (between time X1 and time Y1). The above is repeated for subsequently received interrupt signaling messages.

In some embodiments, the interface controller 22 is configured, responsively to the respective interrupt signaling messages being written to the memory, to cause the device processor to perform the above steps of blocks 302-306.

Figure 4:
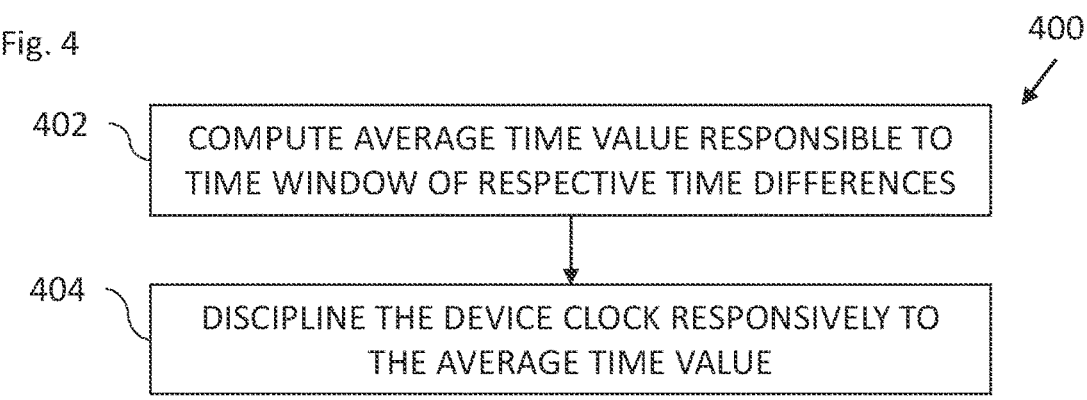
FIG. 4 is a flowchart including optionally steps in the time-synchronization sub-method.

Reference is now made to FIG. 4, which is a flowchart 400 including optionally steps in the time-synchronization sub-method of FIG. 3.

In some embodiments, a correction to the device clock 24 may be based on an average of time differences between retrieved device clock times and corresponding hardware clock times for a certain time window of the device clock times. The processing circuitry 36 may write a series of messages (e.g., 5 or 10 messages), for example, spaced by 10 or 100 milliseconds, to the memory 18. The time differences resulting from these series of messages may then be averaged and used to correct the device clock 24. For example, if there are time differences TD1, TD2, and TD3, the correction is based on an average of TD1, TD2 and TD3, where TD1 is equal to the time difference between a first device clock time and a corresponding hardware clock time, and so on. Therefore, the device processor 16 may be configured to: compute an average time value responsively to the respective time differences computed in the step of block 304 in a time window (block 402); and discipline the device clock 24 responsively to the average time value (block 404).

Figure 5:
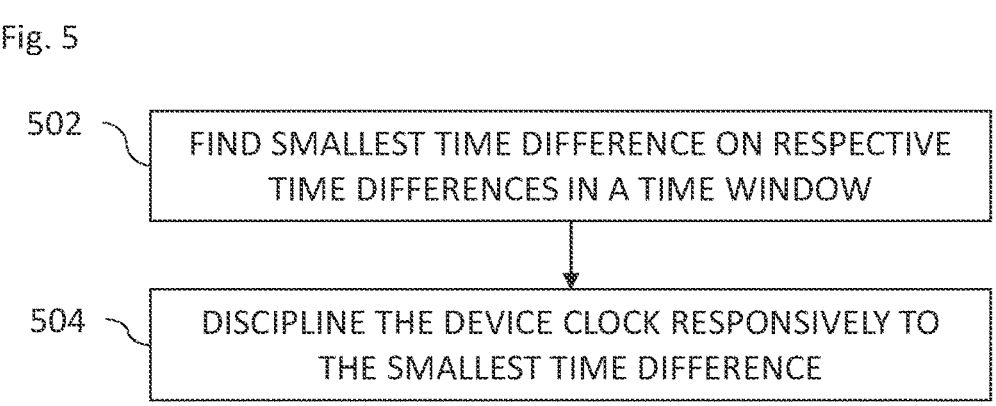
FIG. 5 is a flowchart including alternative optionally steps in the time-synchronization sub-method.

Reference is now made to FIG. 5, which is a flowchart 500 including alternative optionally steps in the time-synchronization sub-method.

In some embodiments, a correction to the device clock 24 may be based on a smallest time difference between retrieved device clock times and corresponding hardware clock times for a certain time window of the device clock times. The processing circuitry 36 may write a series of messages (e.g., 5 or 10 messages), for example, spaced by 10 or 100 milliseconds. The smallest time difference resulting from these series of messages may then be averaged and used to correct the device clock 24. For example, if there are time differences TD1, TD2, and TD3, the correction is based on a smallest of TD1, TD2 and TD3, where TD1 is equal to the time difference of a first device clock time and a corresponding hardware clock time, and so on. Therefore, the device processor 16 may be configured to: find a smallest time difference of the respective time differences computed in the step of block 304 in a time window (block 502); and discipline the device clock 24 responsively to the smallest time difference (block 504).

Figure 6:
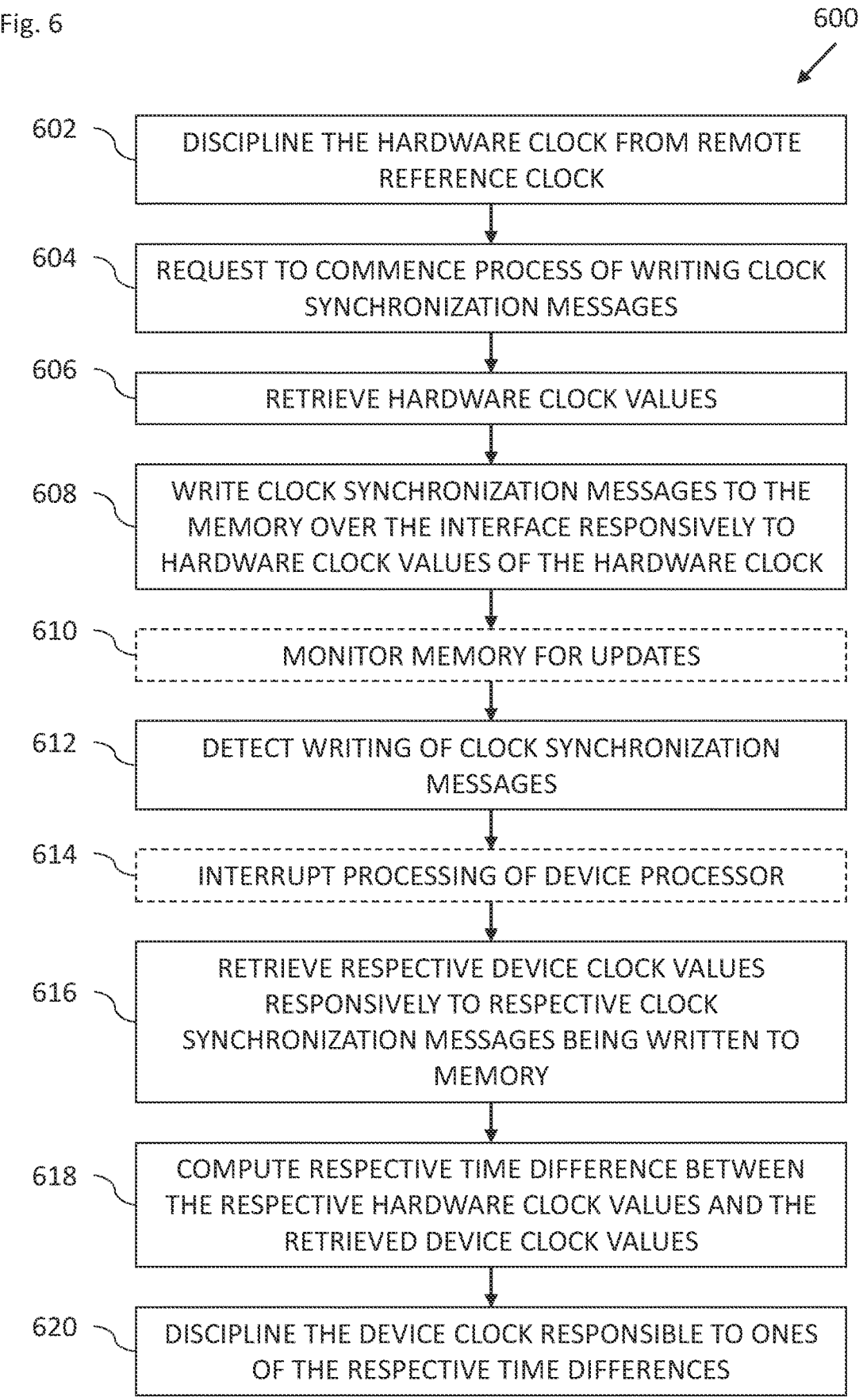
FIG. 6 is a flowchart including steps in an alternative time-synchronization method in the system of FIG. 1.

Reference is now made to FIG. 6, which is a flowchart 600 including steps in an alternative time-synchronization method in the system 10 of FIG. 1.

The method described with reference to FIG. 6 may be implemented using a non-x86 architecture and not in conformity with the PCIe specification, which ignores other data included in high priority interrupt signaling messages. The method described with reference to FIG. 6 adds hardware clock times retrieved from the hardware clock 38 to respective clock synchronization messages (e.g., interrupt signaling messages). For example, hardware clock time A is included in clock synchronization message A written to the memory 18 at time A, and hardware clock time B is included in clock synchronization message B written to the memory 18 at time B, and so on. Therefore, in the method described with reference to FIG. 6, the clock synchronization messages do not need to be written according to a schedule known to both the processing device 12 and the peripheral device 14. In fact, the messages could even be written randomly by the peripheral device 14 to the memory 18. The method is now described in more detail.

The processing circuitry 36 is configured to discipline the hardware clock 38 from the remote reference clock 42 (block 602) using any suitable clock synchronization method or protocol, e.g., PTP. The device processor 16 is configured to request the processing circuitry 36 of the peripheral device 14 to commence a process of writing respective clock synchronization messages to the memory 18 (block 604). The processing circuitry 36 is configured to retrieve respective hardware clock values from the hardware clock 38 (block 606) over time. The processing circuitry 36 is configured to write respective clock synchronization messages including the retrieved respective hardware clock values to the memory 18 over the interface 34 over time (block 608). For example, the clock synchronization message written to the memory 18 at time A according to the hardware clock 38 includes time A, and the clock synchronization message written to the memory 18 at time B according to the hardware clock 38 includes time B, and so on. In some embodiments, the processing circuitry 36 is configured to write each of the respective clock synchronization messages in the memory 18 using atomic writes. In some embodiments, the processing circuitry 36 of the peripheral device 14 is configured to write each of the respective clock synchronization messages to the memory 18 without needing corresponding individual respective requests from the device processor 16 for writing each of the respective clock synchronization messages to the memory 18.

The device processor 16 is configured to retrieve respective device clock values from the device clock 24 responsively to the respective clock synchronization messages being written to the memory 18 (block 616). For example, when the clock synchronization message is written to the memory 18 at time A, the device clock value (time X) is retrieved from the device clock 24, and when the clock synchronization message is written to the memory 18 at time B, the device clock time (time Y) is retrieved from the device clock 24, and so on.

The writing of the clock synchronization messages to the memory 18 may be detected using various methods. For example, the device processor 16 could use a loop to check writing of the messages to the memory 18. In some embodiments, software may be used to monitor the writing of the messages, as described in more detail below.

In some embodiments, monitoring software running on the device processor 16 is configured to monitor the memory 18 for updates (block 610), e.g., the messages being written to the memory 18. Some CPUs have dedicated instructions for use by kernel drivers (e.g., privileged drivers) such as MONITOR(address), MWATT(address) which monitor the memory address and if there is a change wake up the CPU. In some CPUs, e.g., Tiger Lake, there is a user mode version where an application can asked to be woken up when there is a change in data stored at a memory address using such commands as UMONITOR/UMWAIT. UMONITOR allows setting up a linear address range to be monitored by hardware and activates the monitor. The address range may be a write-back memory caching type. The address is contained in r16/r32/r64. The UMWAIT instruction operates with the UMONITOR instruction. The two instructions allow the definition of an address at which to wait (UMONITOR) and an implementation-dependent optimized operation to the CPU while waiting (UMWAIT). The execution of UMWAIT is a hint to the CPU that it can enter an implementation-dependent-optimized state while waiting for an event or a store operation to the address range armed by UMONITOR. The device processor 16 is configured to detect the writing of each of the respective clock synchronization messages in the memory 18 responsively to the monitoring (block 612). The device processor 16 is configured to retrieve (block 616) each of the respective device clock values from the device clock 24 responsively to detecting the writing of each of the respective clock synchronization messages in the memory 18. The device processor 16 is configured to compute respective time differences between the respective hardware clock values included in the respective clock synchronization messages and the respective retrieved device clock values (block 618). The device processor 16 is configured to discipline the device clock 24 responsively to ones of the respective time differences (block 620).

For example, when the clock synchronization message (including time A) is written to the memory 18 at time A, the device clock value (time X) is retrieved from the device clock 24, and when the clock synchronization message (including time B) is written to the memory 18 at time B, the device clock time (time Y) is retrieved from the device clock 24, and so on. The respective time differences for this example are: (a) the difference between time X and time A; (b) the difference between time Y and time B, and so on. The device clock 24 is disciplined based on the time difference between time X and time A, and then at a later time, based on the time difference between time Y and time B.

In some embodiments, the respective clock synchronization messages are respective interrupt signaling messages. In these embodiments, the interface controller 22 is configured to detect the writing of the respective clock synchronization messages in the memory 18 (block 612). The interface controller 22 is configured to interrupt processing of the device processor 16 responsively to the detection of each of the respective clock synchronization messages being written to the memory 18 (block 614), and cause the device processor 16 to: retrieve the respective device clock values from the device clock 24 responsively to the respective clock synchronization messages being written to the memory 18 (block 616); compute the respective time differences between the respective hardware clock values included in the respective clock synchronization messages and the respective retrieved device clock values (block 618); and discipline the device clock 24 responsively to ones of the respective time differences (block 620).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising:
a memory;
a processing device comprising a device processor; and
a peripheral device, comprising:
an interface to share data with the processing device;
a hardware clock; and
processing circuitry to write respective interrupt signaling messages to the memory without needing corresponding individual respective requests from the device processor for writing each of the respective interrupt signaling messages to the memory, responsively to respective hardware clock values of the hardware clock, and wherein the device processor is configured, responsively to the respective interrupt signaling messages being written to the memory, to perform a time-dependent action.

2. The system according to claim 1, further comprising at least one other processing device connected to the peripheral device, wherein the at least one other processing device is configured responsively to other interrupt signaling messages being written to the memory, to perform other time-dependent actions.

3. The system according to claim 1, wherein the device processor is configured, responsively to the respective interrupt signaling messages being written to the memory, to run a given software program.

4. The system according to claim 1, wherein the device processor is configured, responsively to the respective interrupt signaling messages being written to the memory, to pause a given software program.

5. The system according to claim 1, wherein the device processor is configured, responsively to the respective interrupt signaling messages being written to the memory, to send a given message.

6. The system according to claim 1, wherein the device processor is configured, responsively to the respective interrupt signaling messages being written to the memory, to save a software program context.

7. The system according to claim 1, wherein the device processor includes at least one of: a central processing unit; a graphics processing unit; a data processing unit; or a network interface controller.

8. The system according to claim 1, wherein the device processor is configured to request the processing circuitry to commence a process of writing the respective interrupt signaling messages to the memory.

9. The system according to claim 1, wherein the processing circuitry is configured to discipline the hardware clock from a remote reference clock.

10. The system according to claim 1, wherein:
the processing device includes a device clock;
the processing circuitry is configured to write the respective interrupt signaling messages to the memory over the interface responsively to respective hardware clock values of the hardware clock and a common schedule known to the processing device and the peripheral device;
the device processor is configured, responsively to the respective interrupt signaling messages being written to the memory, to:
retrieve respective device clock values from the device clock; and find the respective hardware clock values at which the respective interrupt signaling messages were written to the memory responsively to the schedule; and the device processor is configured to:

compute respective time differences between the retrieved respective device clock values and the found respective hardware clock values; and discipline the device clock responsively to ones of the respective time differences.

11. The system according to claim 1, wherein the processing circuitry is configured to write the respective interrupt signaling messages in the memory using atomic writes.

12. The system according to claim 10, wherein the processing device includes an interface controller to:

detect the writing of the respective interrupt signaling messages in the memory;

interrupt processing of the device processor responsively to the detection of each of the respective interrupt signaling messages being written to the memory; and cause the device processor to:

retrieve the respective device clock values from the device clock;

find the respective hardware clock values at which the respective interrupt signaling messages were written to the memory responsively to the schedule; and discipline the device clock responsively to the respective ones of the respective time differences.

13. The system according to claim 10, wherein the device processor is configured to:

compute an average time value responsively to the respective time differences in a time window; and discipline the device clock responsively to the average time value.

14. The system according to claim 10, wherein the device processor is configured to:

find a smallest time difference of the respective time differences in a time window; and discipline the device clock responsively to the smallest time difference.

15. A system comprising:

a memory;

a processing device comprising: a device processor; and a device clock; and a peripheral device, comprising:

an interface to share data with the processing device;

a hardware clock; and processing circuitry to: discipline the hardware clock from a remote reference clock; retrieve respective hardware clock values from the hardware clock; and write respective clock synchronization messages including the retrieved respective hardware clock values to the memory without needing corresponding individual respective requests from the device processor for writing each of the respective clock synchronization messages to the memory, and wherein the device processor is configured to: retrieve respective device clock values from the device clock responsively to the respective clock synchronization messages being written to the memory; compute respective time differences between the respective hardware clock values included in the respective clock synchronization messages and the respective retrieved device clock values; and discipline the device clock responsively to ones of the respective time differences.

16. The system according to claim 15, wherein the device processor includes at least one of: a central processing unit; a graphics processing unit; a data processing unit; or a network interface controller.

17. The system according to claim 15, wherein the device processor is configured to request the processing circuitry of the peripheral device to commence a process of writing the respective clock synchronization messages to the memory.

18. The system according to claim 15, wherein:

the respective clock synchronization messages are respective interrupt signaling messages; and the processing device includes an interface controller to detect the writing of the respective clock synchronization messages in the memory and interrupt processing of the device processor responsively to the detection of each of the respective clock synchronization messages being written to the memory, and cause the device processor to: retrieve the respective device clock values from the device clock responsively to the respective clock synchronization messages being written to the memory; compute the respective time differences between the respective hardware clock values included in the respective clock synchronization messages and the respective retrieved device clock values; and discipline the device clock responsively to the ones of the respective time differences.

19. The system according to claim 15, wherein the device processor is configured to:

monitor the memory for updates;

detect the writing of the respective clock synchronization messages in the memory; and retrieve the respective device clock values from the device clock responsively to detecting the writing of the respective clock synchronization messages in the memory.

20. The system according to claim 15, wherein the processing circuitry is configured to write the respective clock synchronization messages in the memory using atomic writes.

21. A method comprising:

writing respective interrupt signaling messages to a memory responsively to respective hardware clock values of a hardware clock without needing corresponding individual respective requests for writing each of the respective interrupt signaling messages to the memory; and performing a time-dependent action responsively to the respective interrupt signaling messages being written to the memory.

22. The method according to claim 21, further comprising running a given software program responsively to the respective interrupt signaling messages being written to the memory.

23. The method according to claim 21, further comprising pausing a given software program responsively to the respective interrupt signaling messages being written to the memory.

24. The method according to claim 21, further comprising sending a given message responsively to the respective interrupt signaling messages being written to the memory.

25. The method according to claim 21, further comprising saving a software program context responsively to the respective interrupt signaling messages being written to the memory.

26. The method according to claim 21, further comprising requesting processing circuitry to commence a process of writing the respective interrupt signaling messages to the memory.

27. The method according to claim 21, wherein the writing includes writing the respective interrupt signaling messages to the memory responsively to respective hardware clock values of the hardware clock and a schedule, the method further comprising:
- responsively to the respective interrupt signaling messages being written to the memory, retrieving respective device clock values from a device clock and finding the respective hardware clock values at which the respective interrupt signaling messages were written to the memory responsively to the schedule;
- computing respective time differences between the retrieved respective device clock values and the found respective hardware clock values; and
- disciplining the device clock responsively to ones of the respective time differences.

28. A system comprising:
- a memory;
- a processing device comprising a device processor; and
- a peripheral device, comprising:
- an interface to share data with the processing device;
- a hardware clock; and
- processing circuitry to write respective interrupt signaling messages to the memory over the interface, responsively to respective hardware clock values of the hardware clock and a common schedule known to the processing device and the peripheral device, and wherein the device processor is configured, responsively to the respective interrupt signaling messages being written to the memory, to perform a time-dependent action.

* * * * *